United States Patent [19]

Rapp

[11] 3,999,994

[45] Dec. 28, 1976

[54] GLASS-CERAMICS

[75] Inventor: James Erich Rapp, Toledo, Ohio

[73] Assignee: Owens-Illinois, Inc., Toledo, Ohio

[22] Filed: Dec. 12, 1975

[21] Appl. No.: 640,306

Related U.S. Application Data

[63] Continuation of Ser. No. 507,106, Sept. 18, 1974, abandoned, which is a continuation-in-part of Ser. No. 241,448, April 5, 1972, Pat. No. 3,852,077.

[52] U.S. Cl. .............................. 106/39.6; 106/47 Q
[51] Int. Cl.$^2$ ...................... C03C 3/22; C03C 3/12
[58] Field of Search ........................ 106/47 R, 47 Q

[56] References Cited

UNITED STATES PATENTS 3,113,877  12/1963  Janahuirama .................... 106/47 R

OTHER PUBLICATIONS

Lieberty; J., "Glasfilding in System $K_2O$—$GeO_2$—$Nb_2O_5$", Geotech. Ber., Dec. 1969, 42, (12), p. 510.

*Primary Examiner*—Winston A. Douglas
*Assistant Examiner*—Mark Bell
*Attorney, Agent, or Firm*—Charles S. Lynch; E. J. Holler

[57] ABSTRACT

Thermally crystallizable glasses of the $A - Nb_2O_5 - GeO_2$ system wherein A is $K_2O$, $Li_2O$ or a mixture of $K_2O$ and $Li_2O$ and glass ceramics made therefrom are described. Transparent and opaque glass ceramics may be obtained. The glass ceramics are particularly suitable for use in printed optical circuits, fiber optics, gradient refraction optical lenses and as wave guides.

9 Claims, No Drawings

GLASS-CERAMICS

REFERENCES TO RELATED APPLICATIONS

This is a continuation of application Ser. No. 507,106 filed Sept. 18, 1974 now abandoned which is relied upon and the entire disclosure and specification of which is hereby incorporated by reference, which in turn is a continuation-in-part of application Ser. No. 241,448, filed Apr. 5, 1972, now U.S. Pat. No. 3,852,077 issued Dec. 31, 1974.

THE INVENTION

The present invention pertains to glass ceramics prepared from certain thermally crystallizable niobate germanate glasses, specifically those of the system:

$$A - Nb_2O_5 - GeO_2$$

wherein A is $K_2O$, or $Li_2O$ or a mixture of $K_2O$ and $Li_2O$.

Each of the thermally crystallizable glasses of the present invention can, during an appropriate heat treatment process, be converted to a transparent, inorganic crystalline oxide ceramic material having a different index of refraction than the original glass. The ceramic material thus formed, also known as a glass-ceramic, contains a multiplicity of finely divided crystals randomly dispersed in a glassy matrix remaining as a result of the thermal crystallization. Generally, the crystals can predominate with respect to glassy matrix.

Transparent glass-ceramics of the present invention are useful in a wide variety of fields and applications. The index of refraction of many of these transparent glass ceramics can range from at least 1.8 to over 2, making them suitable for use in optical circuitry and the like.

In general, optical circuitry uses guides of thin, transparent glass film, instead of metal waveguides, deposited on a polished glass substrate. The index of refraction of the film is greater than that of the substrate. In the present invention the entire microcircuit can be initially formed from the thermally crystallizable glass and the path or wave guide is grown or created in the substrate by crystallizing the path and forming a path of crystallized transparent ceramic in the substrate. Many of the compositions of this invention exhibit in the crystallized state a far greater index of refraction than the glass thereby making them well suited for optical circuitry.

Within the borad spectrum of the thermally crystallizable glasses of the $A - Nb_2O_5 - GeO_2$ system of the invention wherein A is $K_2O$ or $Li_2O$ or $Li_2O$ or a mixture of $K_2O$ and $Li_2O$; it has been found that a narrow range of several compositions are particularly suitable and with a ratio of 1.1 being equally suitable.

Several compositions were prepared by melting together $GeO_2$ and $Nb_2O_5$, together with sufficient potassium and/or lithium carbonate to produce the respective alkali metal oxide content shown below.

Each of the nine compositions shown in Table I was heated to a temperature sufficient to melt the ingredients and then held at that temperature for about 1-24 hours, the time being dependent on the specific composition and how long it took for the melting to be completed and a homogeneous melt to be formed. The melt was periodically stirred during this time. Each molten composition was then poured onto a metal plate and another metal plate immediately placed over it to quench the composition. The glass-forming tendencies of each composition were then judged on the ability of the melt to be quenched into glass chips between the metal plates.

Within the scope of this invention are glass ceramics containing the following ingredients in the indicated amounts:

| Ingredient | Mole Percent |
|---|---|
| $GeO_2$ | 22 – 50 |
| $Nb_2O_5$ | 25 – 40 |
| $K_2O$ | 25 – 40 |

Compositions 1, 2 and 3 in Table I form good glasses and, in fact, rods were drawn from the melt of composition 2. Composition 4, however having an amount of $GeO_2$ which is outside the above range, gives poor results with very little glass being formed. While excellent glasses are formed when the $K_2O$ to $Nb_2O_5$ molar ratio is about 1, the ratio can vary from about 1.6:1 to about 0.4:1.

Also encompassed by this invention are glass ceramic composition containing the following ingredients in the indicated amounts:

| Ingredient | Mole Percent |
|---|---|
| $GeO_2$ | 22 – 50 |
| $Nb_2O_5$ | 25 – 40 |
| $Li_2O$ | 24 – 45 |

Compositions 5, 6, 7 and 9 are related to this embodiment. With composition 8 which falls outside of the above range, there was no glass formation when the melt is quenched. Again, it is preferable that the $Li_2O$ to $Nb_2O_5$ molar ratio be about 1, but good glasses are obtained when the ratio is from 2:1 to about 1:1.

TABLE I

| Ingredient | COMPOSITION IN MOLE PERCENT | | | | | | | | |
|---|---|---|---|---|---|---|---|---|---|
| | 1 | 2 | 3 | 4 | 5 | 6 | 7 | 8 | 9 |
| $GeO_2$ | 35 | 50 | 25 | 20 | 30 | 40 | 30 | 20 | 40 |
| $Nb_2O_5$ | 32.5 | 25 | 37.5 | 40 | 35 | 20 | 25 | 40 | 30 |
| $K_2O$ | 32.5 | 25 | 37.5 | 40 | — | — | — | — | — |
| $Li_2O$ | — | — | — | — | 35 | 40 | 45 | 40 | 30 |
| $n_D$ Glass | 1.844 | 1.815 | 1.843 | — | 2.033 | — | — | — | 1.994 |

Some of the compositions of Table I which formed glasses were then subjected to the heat treatment set forth in Table II to crystallize the glass to glass-ceramic.

TABLE II

| GLASS CERAMIC PROPERTIES | COMPOSITIONS | | | | |
|---|---|---|---|---|---|
| | 1 | 2 | 5 | 3 | 9 |
| Transparent Heat Treatment | | | | | |
| Temperature ° F (time, hours) | 1225(2) | 1400(2) | 1075(2-1/2) | 1200(2) | 875(2) |
| | 1200(1-1/4) | 1450(1/2) | | 1300(1/3) | 1150(1/2) |
| Dielectric Constant | | | | | |
| (R.T., 0.5 MHz) | 48.4 | | 76.2 | 57.8 | 59.1 |
| Dissipation Factor (%) | | | | | |
| (R.T., 0.5 MHz) | 1.8 | | 15.8 | 4.3 | 8.4 |
| Index of Refraction | | 1.919 | | | |
| Opaque Heat Treatment | | | | | |
| Temperature ° F (time, hours) | 1350(2) | 1575(2) | 1125(2) | | 1280(2) |
| | 1200(1/4) | 1450(1/2) | 1150(1/6) | | 1150(1/2) |
| Dielectric Constant | 70.1 | 67.6 | 114.4 | | 79.3 |
| (R.T., 0.5 MHz) | | | | | |
| Dissipation Factor (%) | 1.9 | 1.0 | 14.9 | | 86.1 |
| (R.T., 0.5 MHz) | | | | | |

Good quality transparent and opaque glass ceramics were obtained from the system when the ingredients fell within the following ranges:

| Ingredient | Mole Percent |
|---|---|
| $GeO_2$ | 18 – 40 |
| $Nb_2O_5$ | 25 – 45 |
| $K_2O + Li_2O$ | 25 – 45 |

Further, the molar ratio of the alkali metal oxides to $Nb_2O_5$ is from 0.7:1 to 1.4:1 and when such ratio is 1:1, then the alkali metal oxides and the $Nb_2O_5$ must be present in amounts of at least 30 mole percent.

The following glasses were prepared in the same manner discussed above, namely, melting the ingredients and quenching the melt between metal plates.

TABLE IV

| | COMPOSITIONS IN MOLE PERCENT | |
|---|---|---|
| Ingredient | 10 | 11 |
| $GeO_2$ | 30 | 20 |
| $Nb_2O_5$ | 35 | 40 |
| $K_2O$ | 17.5 | 20 |
| $Li_2O$ | 17.5 | 20 |
| $n_D$ Glass | 1.940 | |

The glasses were then subjected to the following heat treatment schedules.

TABLE V

| Opaque Glass Ceramics | 10 |
|---|---|
| Heat Treatment | 1125(2) |
| Temperature ° F (time, hours) | 1075(1/2) |
| Dielectric Constant | |
| (R.T., 0.5 MHz) | 72.1 |
| Dissipation Factor (%) | |
| (R.T., 0.5 MHz) | 2.3 |
| TCC(%) (0–100° C) | — |

The techniques for forming optical waveguides have been described in the literature; see, for example, the article appearing in "Electronics" magazine for July 5, 1971, entitled "Fiber Optics Sharpens Focus on Laser Communications" Page 47 et seq. See also "Electronics" for Aug. 31, 1970, Page 60 et seq.

Transparent glass-ceramics having two or more indices of refraction can be prepared by subjecting different portions of the thermally crystallizable glass to the particular different heating schedules which produce the desired refraction indices.

Lenses, including eyeglass lenses, which are normally convex at one surface, can be made from flat sheets of transparent glass-ceramic wherein the center of the sheet or lens has a certain index of refraction and a number of concentric areas around the center are given different indices of refraction by subjecting such areas to the requisite heat schedules so that the indices of refraction are in ascending or descending magnitudes from the center to the outer periphery of the lens. By utilizing an appropriate temperature gradient from the center to the edge, a smooth and continuous variation of the index of refraction from the center to the edge can be achieved. Changing the temperature gradient will change the resulting index of refraction gradient. This is an advantage over the Fresnel type lens where discrete changes in the index are achieved by gluing together glasses having different indices. Fresnel type lenses are shown in U.S. Pat. No. 3,486,808 and U.S. Pat. No. 3,542,535.

Means for applying the gradient temperature to the thermally crystallizable glass are known in the art. Such lenses can be made to produce the same refraction of light rays as presently obtained by grinding the surface of a piece of glass to shape a particular lens. By combining grinding and the index of refraction gradient, even greater refraction of light can be obtained than by utilizing either the grinding or the index gradient alone. The process of imparting concentric indices of refraction to a thermally crystallizable glass to form a glass-ceramic article can be applied to a number of such glass articles, including transparent telescope mirror blanks which are made of glass-ceramic.

Also, while transparent glass ceramics are necessary for the foregoing purposes, the composition of the invention also includes opaque glass ceramics for use in a wide variety of purposes which would be readily apparent to those skilled in this technology.

Shaped articles can be made from the compositions described above. For example, an optical circuit can be created from a shaped body of the glass and the wave guide or path can be formed of the crystallized glass ceramic. Also lenses can be formed wherein a portion of the lenses consists of the crystallized glass ceramic and the remainder of uncrystallized glass. In each of the above examples, the shaped body contains at least a portion which consists of the transparent glass ceramic of this invention.

While the glasses and glass-ceramics of the invention have been discussed in terms of the sole essential ingredients, it will be evident to those skilled in the art that minor amounts, preferably not more than 10% and most preferably no more than 5% by weight of other metal oxides which are compatible with the glass and glass-ceramic composition can be used. Care should be taken, however, to insure that such other metal oxides do not materially affect the basic characteristics of the glasses and glass-ceramic of the present invention.

What is claimed is:

1. A glass-ceramic composition prepared by thermal in situ crystallization of a thermally crystallizable glass consisting essentially of the following ingredients with indicated amounts:

| Ingredients | Mole Percent |
| --- | --- |
| $GeO_2$ | 22 – 50 |
| $Nb_2O_5$ | 25 – 40 |
| $K_2O$ | 25 – 40 | wherein the molar ratio of $K_2O$ to $Nb_2O_5$ is from about 1.6:1 to about 0.4:1.

2. A shaped article of the composition of claim 1 wherein one or more portions thereof consist of a transparent glass ceramic of a composition as defined in claim 1 and the remaining portions are glass of the same composition as defined in claim 1.

3. A glass-ceramic composition prepared by thermal in situ crystallization of a thermally crystallizable glass consisting essentially of the following ingredients in the indicated amounts:

| Ingredients | Mole Percent |
| --- | --- |
| $GeO_2$ | 22 – 50 |
| $Nb_2O_5$ | 25 – 40 |
| $Li_2O$ | 25 – 45 | wherein the molar ratio of $Li_2O$ to $Nb_2O_5$ is from about 2:1 to about 1:1

4. A shaped article of the composition of claim 3 wherein one or more portions thereof consist of a transparent glass ceramic of a composition as defined in claim 3 and the remaining portions are glass of the same composition as defined in claim 3.

5. A glass ceramic composition formed by thermal in situ crystallization of a thermally crystallizable glass consisting essentially of the following ingredients in the indicated amounts:

| Ingredients | Mole Percent |
| --- | --- |
| $GeO_2$ | 18 – 40 |
| $Nb_2O_5$ | 25 – 45 |
| $K_2O + Li_2O$ | 25 – 45 | wherein the molar ratio of $K_2O + Li_2O$ to said $Nb_2O_5$ is from 0.7:1 to 1.4:1 and when said molar ratio of said $K_2O + Li_2O$ to said $Nb_2O_5$ is about 1:1, then said $K_2O + Li_2O$ and said $Nb_2O_5$ must be present in amounts of at least 30 molar percent each.

6. A shaped article of the composition of claim 5 wherein one or more portions thereof consist of a transparent glass ceramic as defined in claim 5 and remaining portions are glass of the same composition as defined in claim 5.

7. A transparent glass ceramic having the composition set forth in claim 1.

8. A transparent glass ceramic having the composition set forth in claim 3.

9. A transparent glass ceramic having the composition set forth in claim 5.

* * * * *